(12) United States Patent
Yu et al.

(10) Patent No.: US 9,479,918 B2
(45) Date of Patent: Oct. 25, 2016

(54) METHODS, COMPUTER PROGRAM PRODUCTS AND APPARATUSES ENABLING TO IMPROVE NETWORK CONTROLLED DISCOVERY IN MOBILE COMMUNICATION NETWORKS

(75) Inventors: Ling Yu, Espoo (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 46 days.

(21) Appl. No.: 14/418,512

(22) PCT Filed: Aug. 1, 2012

(86) PCT No.: PCT/EP2012/065038
§ 371 (c)(1),
(2), (4) Date: Apr. 8, 2015

(87) PCT Pub. No.: WO2014/019618
PCT Pub. Date: Feb. 6, 2014

(65) Prior Publication Data
US 2015/0208225 A1    Jul. 23, 2015

(51) Int. Cl.
*H04W 4/00* (2009.01)
*H04W 8/00* (2009.01)
(Continued)

(52) U.S. Cl.
CPC ............ *H04W 8/005* (2013.01); *H04W 4/008* (2013.01); *H04W 4/023* (2013.01); *H04W 4/06* (2013.01); *H04W 72/04* (2013.01); *H04W 76/002* (2013.01); *H04W 76/023* (2013.01)

(58) Field of Classification Search
CPC ... H04W 8/005; H04W 4/008; H04W 4/023; H04W 4/06; H04W 76/002; H04W 76/023
See application file for complete search history.

(56) References Cited

U.S. PATENT DOCUMENTS

2005/0130634 A1*  6/2005  Godfrey ................. H04W 4/02
455/414.1
(Continued)

FOREIGN PATENT DOCUMENTS

EP          1 528 714 A1    5/2005

OTHER PUBLICATIONS

Geier, Jim, "802.11 Beacons Revealed", Oct. 31, 2002, wi-fi planet, tutorials, 3 pgs.
(Continued)

*Primary Examiner* — Abdelnabi O Musa
(74) *Attorney, Agent, or Firm* — Harrington & Smith (57) ABSTRACT

A network entity interlaces with at least one other apparatus. The network entity receives a plurality of reports from respective terminals, each report being indicative of a detection of at least one particular apparatus of a specific type by the respective terminal, and analyzes the plurality of reports. The network entity determines that terminals, the reports of which are indicative of the same particular apparatus of the specific type, are in proximity to each other, and causes transmission of a corresponding proximity indication to each terminal for which a proximity to one or more other terminals was determined. Similarly, corresponding proximity discovery agent entities, i.e. apparatus of the specie type, corresponding terminal apparatuses and related methods as well as computer program products are envisaged.

19 Claims, 8 Drawing Sheets

(51) Int. Cl.
*H04W 4/02* (2009.01)
*H04W 4/06* (2009.01)
*H04W 76/02* (2009.01)
*H04W 72/04* (2009.01)
*H04W 76/00* (2009.01)

(56) References Cited

U.S. PATENT DOCUMENTS

2005/0157689 A1* 7/2005 Schnurr .............. H04L 12/5815
370/338
2010/0254308 A1* 10/2010 Laroia ................... H04W 8/005
370/328
2011/0258313 A1* 10/2011 Mallik ................. H04W 8/005
709/224
2012/0011247 A1* 1/2012 Mallik ................. H04W 8/005
709/224

OTHER PUBLICATIONS

3GPP TS 25.331 V10.0.0 (Jun. 2010), "3$^{rd}$ Generation Partnership Project; Technical Specification Group Radio Access Network; Radio Resource Control (RRC); Protocol specification (Release 10)", sections 10.2.48-10.2.49 and 10.3.1.1-10.3.2.6, 47 pgs.

* cited by examiner

METHODS, COMPUTER PROGRAM PRODUCTS AND APPARATUSES ENABLING TO IMPROVE NETWORK CONTROLLED DISCOVERY IN MOBILE COMMUNICATION NETWORKS

FIELD OF THE INVENTION

The present invention relates to methods, computer program products and apparatuses enabling to improve network controlled discovery in mobile communication networks. In particular, the proposed methods, computer program products and apparatuses are applicable and pertain to network controlled and/or assisted discovery of devices for device-to-device communication (D2D)

BACKGROUND

Mobile data transmission and data services are constantly making progress. With the increasing usage of mobile communication, network organization and optimization is becoming more and more important. Also, in this context, according to one aspect, investigations are made to remove some communication traffic from the network and to use D2D communication between devices such as terminals. This and other aspects are being investigated, e.g. in the framework of LTE™ or LTE™-A.

Insofar, the present invention relates in particular but without limitation to mobile communications, for example to environments under WCDMA (Wideband Code Divisional Multiple Access), LTE™ (Long Term Evolution) or LTE™-A (LTE™ Advanced), UMTS (Universal Mobile Telecommunication System), 3GPP (3rd Generation Partnership Project) or any other communication scenario, potentially standardized by ETSI (European Telecommunication Standards Institute) and/or other local or regional standardization bodies e.g. NGMN (Next Generation Mobile Networks), and can advantageously be implemented as or in chipsets, or modules, or units, or apparatuses of devices (e.g. network entities such as a transceiver device also known as base station, or NodeB, or evolved NodeB eNB, or e.g. a mobility management entity MME) forming part of those networks as well as correspondingly in terminals such as user equipments UE, mobile stations MS, or the like, such as smartphones, and/or other mobile communication enabled terminals such as laptops or the like enabled to communicate via e.g. at least one (wireless) access technology such as UMTS, LTE™, WLAN, etc.

More particularly, the present invention relates to those apparatuses/units of devices or network entities and terminals that are applied in such communication networks for the purposes of discovery of devices such as terminals UE that are suitable for a D2D communication.

With the evolution of the LTE™ system, future cellular networks will become more and more complex, various and huge. For network operators, along with the usage of new technologies, how to reduce network infrastructure costs and operating expenses is a big challenge. So, under one aspect to accomplish such goal, investigations are made into D2D communication.

For example, 3GPP LTE™-A Rel-12 started to address LTE™-A support for network-controlled D2D discovery and communications. In this regard, 3GPP SA1 has already started carrying out a study for potential services and requirements for D2D discovery and communications. Those are referred to as Proximity Services (ProSe). The objective is to study use cases and to identify potential requirements for an operator network controlled discovery and communication between (D2D enabled) devices which are in proximity, under continuous network control, and which are under a 3GPP network coverage, for e.g. commercial/social use, network offloading, public safety, and/or integration of current infrastructure services, so as to assure the consistency of the user experience including reachability and mobility aspects. Additionally, the study item will study use cases and identify potential requirements for public safety, in case of absence of EUTRAN coverage (subject to regional regulation and operator policy, and limited to specific public-safety designated frequency bands and terminals).

One of fundamental requirements of ProSe is to enable a device to discover other devices in its proximity and to be discoverable. To facilitate proximity device discovery, the most often applied technique is to have the devices transmit some individual reference signals unique among a local networking neighborhood of the devices, or to broadcast some predefined beacons in certain predefined channels.

Given an increasing and huge number of terminal (UE) devices in future mobile cellular systems employing D2D discovery and communications, it becomes a big challenge to provide reliable and efficient autonomous discovery mechanism based on device broadcasted beaconing solution (i.e. each device broadcasts an individual beacon signal to enable the others to detect it) in terms of resource usage, power consumption and control overhead.

The cellular network has been developed from homogeneous network to heterogeneous network in which more and more local area nodes (e.g. micro/pico eNB's or BTS's, femto eNB's, relay nodes, WLAN (WiFi™) access points, etc.) will be deployed in certain local areas to boost capacity, extend the coverage and provide a more "environmentally friendly" radio solution.

Different aspects of device/peer discovery for D2D/P2P communication have been discussed. However, all previous proposals are based on a discovery signal (e.g. beacon/pilot signal) broadcasted by the device itself to be discovered, which broadcasted signal is used to enable the other devices to detect/discover the broadcasting device.

Allowing the device itself to broadcast a beacon/pilot signal for proximity device discovery, however, imposes a burden on spectrum usage and hence is not seen as an efficient solution from spectrum usage, power consumption and control overhead perspective, especially in the case that a large number of mobile devices with D2D/P2P communication capability are located within a certain limited local area.

Insofar as some kind of network assisted discovery was previously proposed, such "network assistance" in one case resides in that the device only performs peer discovery upon network request (instead of all the time), while in another case an enhancement was proposed in that use is made of an access point/base station to relay some discovery information sent from terminals such as mobile devices to be discovered. Hence, in such scenario, the "network assistance" resides only in a relaying of discovery signals broadcasted as usual from terminals.

Thus, there is still a need to further improve such systems.

SUMMARY

Various aspects of examples of the invention are set out in the claims.

According to a first aspect of the present invention, there is provided in terms of an apparatus of/method at a network entity an apparatus as set out in claim 1
and a method as set out in claim 30.

According to a second aspect of the present invention, there is provided in terms of an apparatus of/method at a proximity discovery agent entity an apparatus as set out in claim 16
and a method as set out in claim 45.

According to a third aspect of the present invention, there is provided in terms of an apparatus of/method at a terminal entity an apparatus as set out in claim 20
and a method as set out in claim 49.

Advantageous further developments are as set out in respective dependent claims in relation to each of the above aspects.

According to a further aspect of the present invention, there are provided computer program products, as set out in claim 59, comprising computer-executable components which, when the program is run on a computer, are configured to implement and/or carry out the above method aspects. Those computer program product/products may be embodied as a computer-readable storage medium.

Thus, improvement is based on methods, apparatuses and computer program products according to at least one or more embodiments covered by the above aspects.

For example:
at least some of the proposed aspects are beneficial in that they provide for network assistance for proximity device discovery, especially for the scenario where a network controlled D2D operation is preferred,
at least some of the proposed aspects provide a reliable and efficient autonomous discovery mechanism which may no longer be based on devices' broadcasted beaconing solution, but on the usage of specifically selected/configured devices referred to herein as proximity discovery agent, PDA,
at least according to aspects of the invention, opportunities provided by deployed local nodes are employed in that one or more of those nodes are selected and/or configured as a new functional network entity for network assisted proximity discovery, i.e. so-called proximity discovery agents and methods based thereon for proximity discovery,
at least according to aspects of the invention, spectrum usage is more efficient as the devices to be discovered do no longer broadcast individual broadcast signals,
at least according to aspects of the invention, as the devices to be discovered do no longer broadcast individual broadcast signals, the devices' performance is also improved in terms of power consumption and reduced control overhead,
according to at least aspects of the invention, based on the proposed network assisted proximity discovery method which involves one or more proximity discovery agents, the proximity discovery is based on either the normal downlink transmissions of the local access points (selected as PDAs) or the specifically configured proximity detection signals, PDSs, from a selected (limited) number of PDAs, which brings significant savings on the spectrum/resources usage for supporting proximity discovery compared with the prior arts in which each individual (terminal) device needs to broadcast the discovery signal,
according to at least an aspect of the invention, the specifically configured proximity detection signals, PDSs, can be broadcasted from a selected (limited) number of terminal devices which are configured to act as PDAs;
further, according to at least an aspect of the invention, the proposed scheme also brings the benefit for the proximity discovery enabled UEs in terms of savings in energy consumption, as the extensive scanning for all the possible discovery signals from each individual device is not needed as well as the "own" broadcasting of discovery signals is not necessarily needed any more;
further, according to at least an optional aspect of the invention, a terminal device UE is configured to determine by itself or to be guided (instructed) by the network to the extent that e.g. if the terminal UE does not detect any preconfigured PDA(s) in the surrounding proximity, then it may keep on or go back to the beaconing/broadcasting based operation; or else if the terminal UE detects some of preconfigured PDA(s) then it may switch off (or switch to sleep state) the beaconing/broadcasting based discovery operation or at least reconfigure itself to the extent that the broadcasting occurs less frequent (using some longer beaconing interval) or less intense (reducing transmit power, reducing information, changing channel, etc.) for spectrum and energy saving purpose. Such feature(s) can be implemented as an alternative or in addition to the aspect that a terminal UE may be configured as a PDA.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Examples of aspects of the invention will be described herein below with reference to the accompanying Figures.

In various standards, different names may apply for entities involved in aspects of the present invention. Therefore, as a mere example only that was chosen to describe a possible implementation framework of the present invention, reference is made to LTE™ and related terminology. Abbreviations and definitions as set out in such documents/context shall also apply for the purpose of describing at least concepts/embodiments of this invention, though those are not intended to limit the applicability of those concepts/embodiments to other telecommunication environments.

Figure 1:
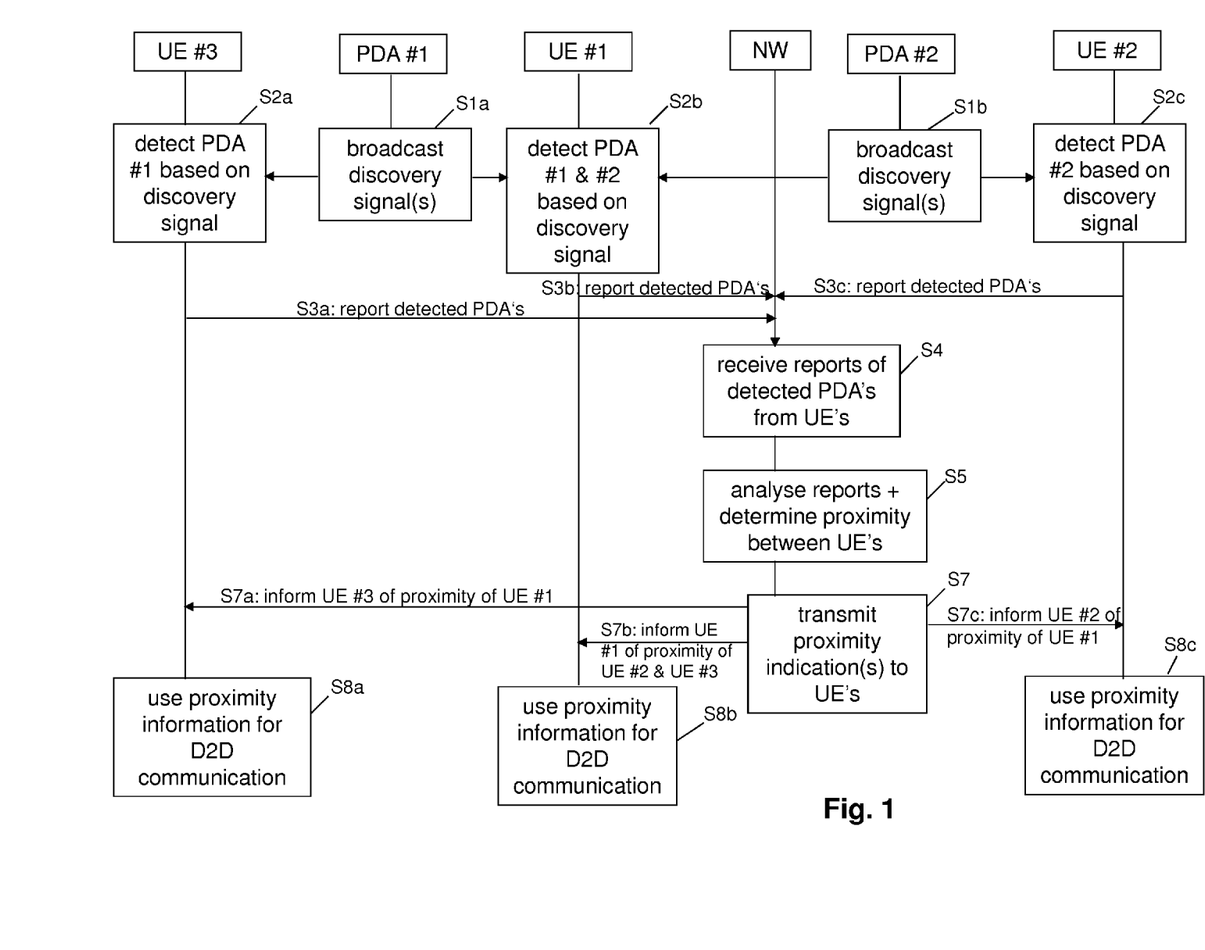
FIG. 1 illustrates an example of a signaling diagram among entities involved.

FIG. 1 illustrates an example of a signaling diagram among entities involved. Entities involved in the signaling in relation to at least an aspect of the present invention are illustrated in horizontal direction, while the actions taken by the respective entities over time are substantially illustrated in vertical direction. Signaling/messages sent from/received at an entity are illustrated by arrows extending in horizontal direction between entities.

FIG. 1 shows terminal devices such as user equipments, UE, or smartphones or any other wireless device for mobile communication which are denoted as UE#1, UE#2, and UE#3, respectively. Furthermore, a network entity or network is illustrated as an entity labeled NW. Entities referred to in this application as proximity discovery agents are denoted by PDA #1 and PDA #2, respectively.

It is to be noted that more than three terminals UE's can be involved of course, and that also more than two proximity discovery agents PDA's can be involved. Furthermore, it is to be noted that a PDA can be a local access point such as a base transceiver station BTS or evolved NodeB eNB, or a WLAN access point or the like, or, can be a specifically configured terminal or user equipment UE. Though, for the description of FIG. 1, focus is laid on the respective functional behavior of the entities.

It is further to be noted that FIG. 1 does not show signaling/processing between the entities and/or at the entities that is involved in configuring UE's and/or PDA's. Rather, those aspects are at this stage not particularly highlighted, but will be explained later on, e.g. with reference to FIGS. 2, 3, and 4, respectively.

With reference to FIG. 1, according to at least an aspect of the present invention, each PDA, PDA #1 and PDA #2, in a first stage broadcasts one or more discovery signals (S1a for PDA#1, S1b for PDA#2). The broadcasting does not need to be synchronized in time for those PDA's and is most likely unsynchronized. Also, the broadcasting does not need to take place on the same physical resources (frequencies, time slots or physical resource blocks PRB, or the like). The broadcasted discovery signals are receivable by the terminals UE in the proximity (in the neighborhood) of the respective PDA. Insofar, for the illustrated scenario it is assumed that UE#1 and UE#3, respectively, detect PDA#1 based on the discovery signal or signals broadcasted by PDA#1. Furthermore, it is assumed that UE#2 detects PDA#2 based on the discovery signal or signals broadcasted by PDA#2. More specifically, UE#1, given its proximity to PDA#2 as illustrated in FIG. 1, also detects PDA#2 based on the discovery signals broadcasted by PDA#2. This detection is illustrated in respective stages S2a (for UE#3), S2b (for UE#1), and S2c (for UE#2). Responsive to the detection of one or more PDA's at a respective user equipment or terminal, each terminal UE reports the detected PDA or the detected plural PDA's to the network NW. Hence, in a stage S3a, terminal UE#3 reports the detected PDA#1. In a stage S3b, terminal UE#1 reports detected PDA's #1 and #2 towards the network. Furthermore, in a stage S3c, terminal UE#2 reports detected PDA#2 towards the network. The network entity NW in a stage S4 receives those reports, from the UE's, of detected PDA's within the network or at least within a specified network region. In a stage S5, the network entity analyzes the reports and determines, based on the reports, a proximity between the reporting terminals. Subsequently, in a stage S7, based on the analysis, the network transmits proximity indications to the user equipments. That is, in a stage S7a, the network entity NW (or network) informs terminal UE#3 of the proximity of terminal UE#1 (because both terminals UE#1 and UE#3 received the broadcasted discovery signals of PDA#1). Further, in a stage S7b, the network entity informs terminal UE#1 of the proximity of terminals UE#3 and UE#2 (because both receive broadcasted discovery signals from PDA#2). And further, at a stage S7c, the network entity NW informs terminal UE#2 of the proximity of terminal UE#1. Hence, terminal UE#1 is in proximity to UE#3 as well as in proximity to UE#2 according to this specific example. Based on the received information from the network entity, each respective terminal may then use the proximity information, e.g., for initiating a device-to-device, D2D, (or peer-to-peer) communication with one or more of the terminals being in proximity or for some other proximity service applications. This is illustrated in stages S8 (S8a for UE#3, S8b for UE#1, and S8c for UE#2, respectively). The further process in terms of device-to-device communication is not represented in this FIG. 1 as it may be assumed to follow general rules after the detection.

Thus, as derivable from the above description of FIG. 1, according to at least an aspect of the present invention, due to the introduction of the proximity discovery agent entity (PDA), proximity discovery is assisted by such new entity. It is thus not necessary anymore to exclusively rely on a detection of discovery signals broadcasted by each individual device (terminals UE#1, UE#2, UE#3, . . . ) as in the prior art. According to at least the above example aspect of the present invention, upon detecting one or more PDA entities, the respective terminal UE reports the detection to the network NW. The network entity NW, based on the reports from all the devices within the network or within at least a certain service area, determines and informs the devices, i.e. terminals, which other terminal devices are in its proximity so as to promote discovery of device-to-device communication enabled terminals.

However, as will be set out later on in more detail (e.g. with reference to FIG. 6) terminals may be configured to perform proximity discovery with the aid of PDA's and/or based on their own "individually" broadcasted discovery signals.

Figure 2:
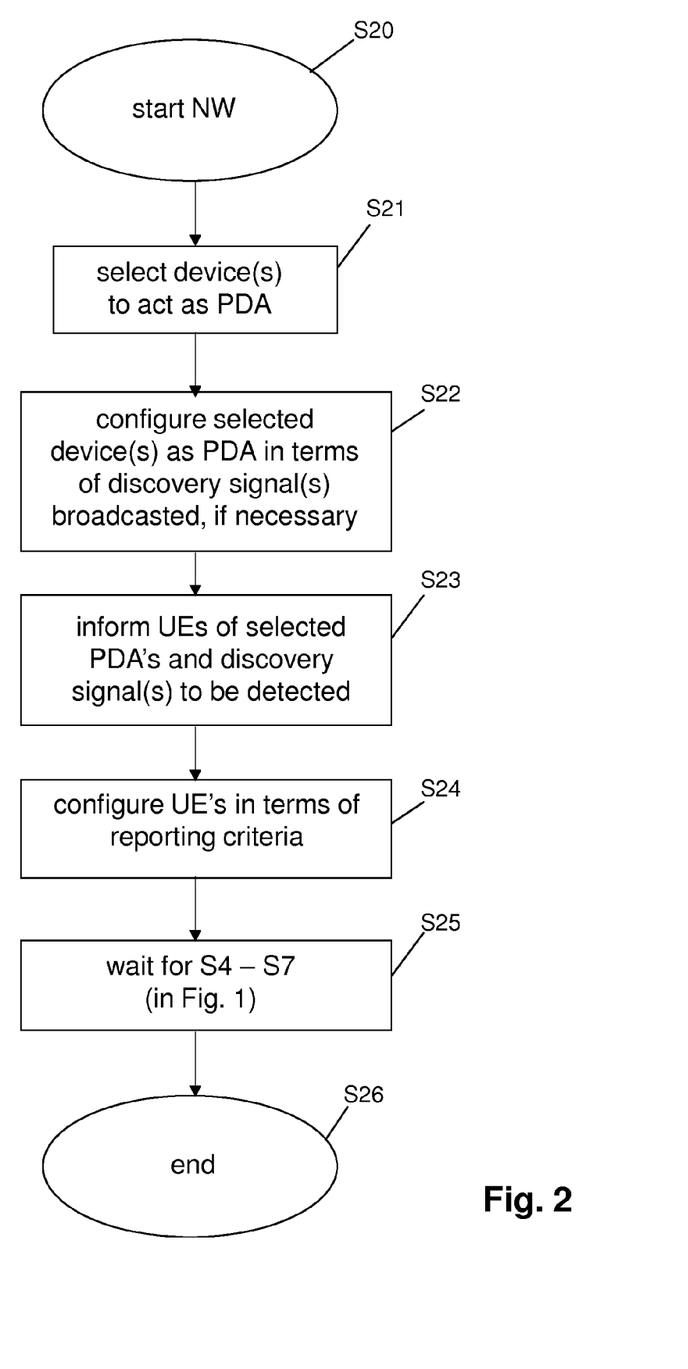
FIG. 2 illustrates an example of at least an aspect of a processing performed at a network entity.

FIG. 2 illustrates a flowchart that highlights a processing executed at a network or network entity NW. For example, such network entity illustrated as NW in FIG. 1 could be a mobility management entity MME, or an evolved NodeB, eNB, or some core network entity. The processing starts at stage S20. In a stage S21, the network entity selects one or more devices to act as a proximity discovery agents PDA. That is, among all potential devices present within the network or within at least a certain network area, a subset of devices is selected.

The selection criteria can be manifold. For example, the selection of e.g. eNBs such as micro/pico/femto eNBs or similar base transceiver stations BTS or WLAN (WiFi™) access points (AP) can be selected according to a geographical distribution of those nodes within the network area concerned. E.g. the selection could be done so as to select a same number of PDAs per area unit. Or, the selection could be done so as to select at least one PDA per specified number of users prevailing in a certain network area. In addition or alternatively, it can depend on the capacity of those nodes and/or the network/communication load of those nodes. The selection can be semi-statically or dynamically.

In a subsequent stage S22, the selected devices that are selected to act as PDA are configured. Such configuration, according to at least an aspect of the present invention, concerns the configuration of discovery signals that are broadcasted by the device. Note that in at least one scenario, the devices do not need a specific further configuration to act as a PDA but that the terminals UE receive information of which devices and their "normal" broadcast signals, upon receipt, are to be considered as a discovery signal. According to at least another scenario, devices configured to act as a PDA are configured so as to extend the broadcasted system information by e.g. a specific PDA indication, e.g. one bit which identifies the broadcasting entity as a PDA.

Figure 7A:
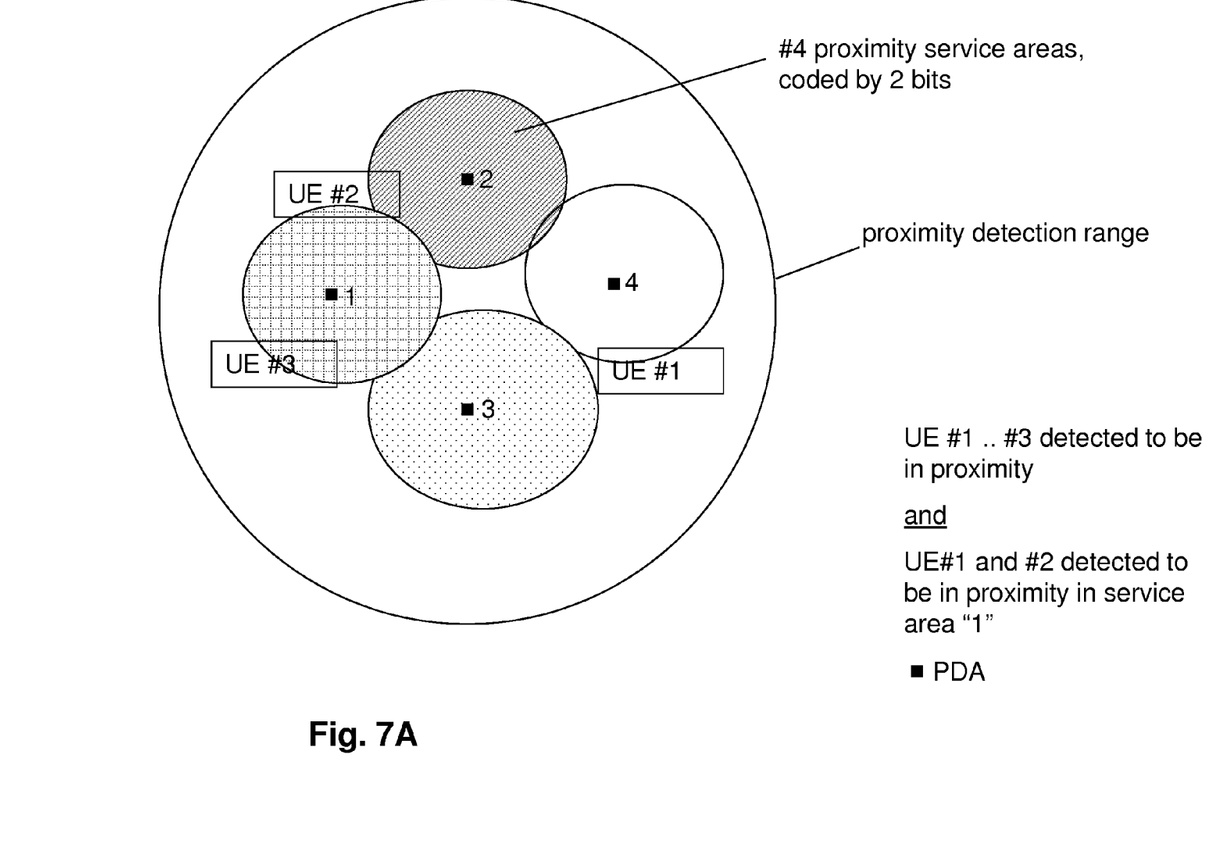
Figure 7B:
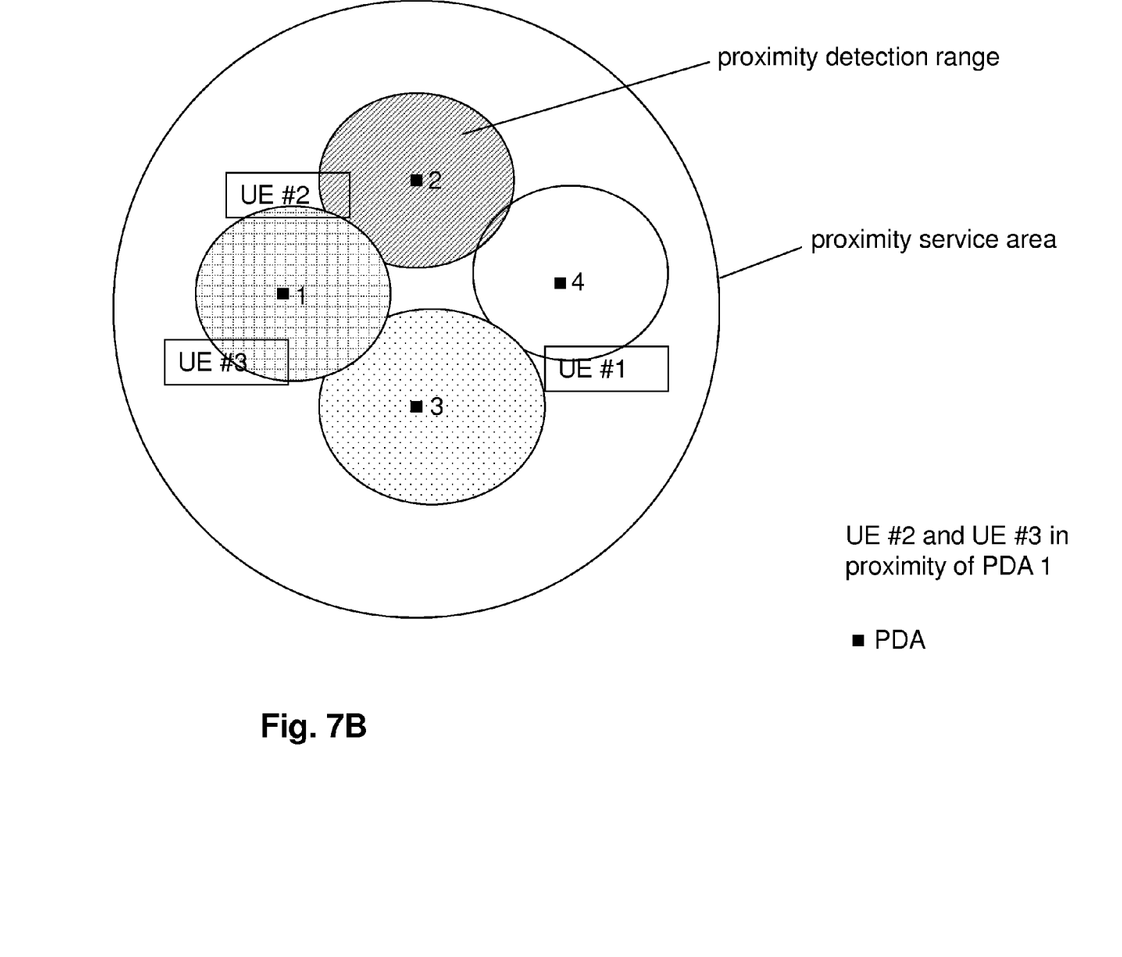

However, instead of using a single PDA indication bit, the PDA devices could be configured to broadcast a unique proximity discovery signal PDS comprising plural bits. FIGS. 7 (A&B) graphically illustrate a relation between service area(s) and detection range(s), respectively, and a significance of using (instead of a single bit PDA indication) multi-bit encoded proximity discovery signals PDS in different scenarios.

As graphically illustrated in FIG. 7A, instead of using a single PDA indication bit, the PDA devices could be configured to broadcast a unique proximity discovery signal PDS comprising plural bits which inherently has for example the D2D or, more generally, the proximity service area encoded therein. For example, with a unique PDS signal of 2 bits, 4 different proximity service areas (e.g. D2D service areas or other ProSe application service area) could be coded. Then, the network, based on reported/detected ProSe service area identifier(s), determines which UEs are in proximity (to each other) on a per service area basis (with a service area granularity within a detection range).

According to another option, as graphically illustrated in FIG. 7B, there may be scenario that a D2D/ProSe application service area is larger than a proximity detection range or ranges (e.g. determined by PDA broadcasting transmit power). In such case, a PDA indication comprising plural bits, or rather a PDS signal as mentioned above, may uniquely identify a proximity discovery agent PDA within one D2D/ProSe service area. Then, the network, based on reported PDA identifier(s), determines which UEs are in proximity (to each other) on a per PDA basis (with a PDA granularity within a service area range).

In a further modification (not shown), the number of bits coding a PDS signal may be adapted to combine the above two scenarios to a joint scenario. E.g. 2 bis encoding service areas, 2 further bits encoding devices per service are, as exemplified in the following table:

| PDS Bits | service area ID | device "ID" |
|---|---|---|
| 00 00 | A | 1 |
| 00 01 | A | 2 |
| 00 10 | A | 3 |
| 00 11 | A | 4 |
| 01 00 | B | 1 |
| 01 01 | B | 2 |
| 01 10 | B | 3 |
| 01 11 | B | 4 |
| 10 00 | C | 1 |
| 10 01 | C | 2 |
| 10 10 | C | 3 |
| 10 11 | C | 4 |
| 11 00 | D | 1 |
| 11 01 | D | 2 |
| 11 10 | D | 3 |
| 11 11 | D | 4 |

In any case, in a stage S23, the terminals are informed by the network of the selected PDA's and receive information necessary for the terminals to detect the (unique) discovery signals and/or to interpret broadcasted signals as discovery signals. This information, according to at least some aspects, also includes the physical transmission information such as transmission power, transmission intervals, transmission resources in frequency/time domain, and so on.

Furthermore, in a stage S24, the network configures the terminals UE in terms of specific reporting criteria so as to manage and avoid unnecessary reporting from the terminals toward the network. For example, reporting may be configured to occur only under certain stable conditions of detection, e.g. after detection of the same PDA for a certain period of time, and/or after detection of the same PDS for a specific number of consecutive detections, and/or if a received power difference of two consecutive detections of a specific PDS is not larger than a certain threshold.

Thereafter, i.e. after stage S24, the network waits for stages S4 to S7 illustrated in FIG. 1. This is illustrated in FIG. 2 as stage S25. The process ends in stage S26.

Optionally, but not shown in FIG. 2, dependent on certain conditions prevailing in the network or at a certain PDA (and reported to the network), or at a certain UE (and reported to the network), the process returns to stage S21 and devices are then dynamically selected or re-selected to act as a PDA, or the process returns to stage S24 and terminal devices are then updated in terms of changed reporting criteria to be applied.

Figure 6:
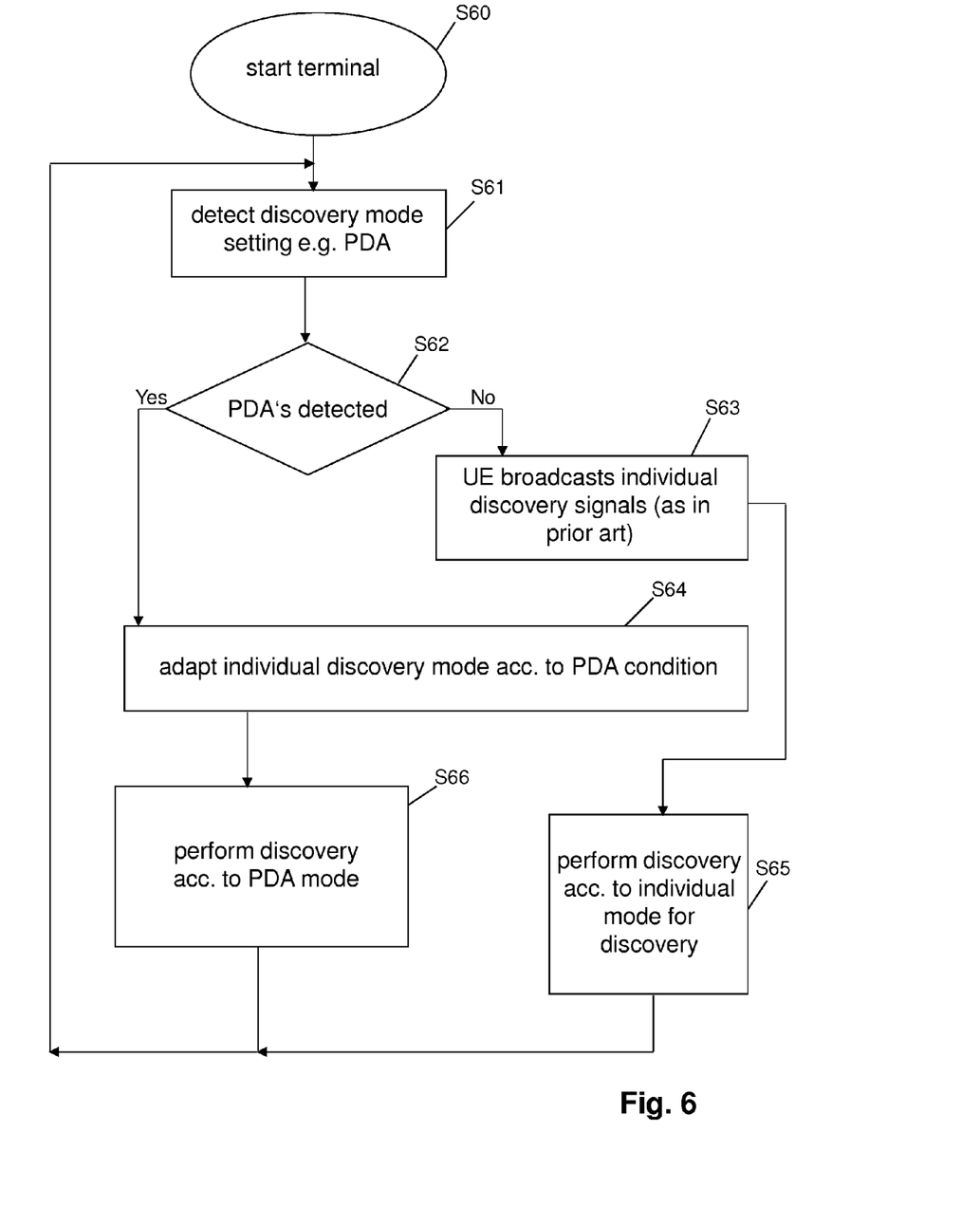
FIG. 6 shows a flowchart of an example of at least another aspect of a processing performed at a terminal such as a UE, and FIGS. 7 (A&B) graphically illustrate a relation between service area(s) and detection range(s), respectively, and a significance of using multi-bit encoded proximity discovery signals PDS in different scenarios.

Note that according to at least an aspect to be described with reference to FIG. 6, in a stage S23-S24 (or similar stage), the network may transmit information and configuration data to a terminal UE, which, in the example scenario of FIG. 6, are used to adapt a terminal's individual discovery mode operation (which, as in prior art, is based on a terminal's own broadcasted discovery signals). Thus, according to such aspect, terminals UE's may be configurable to perform proximity discovery based on their own broadcasted discovery signals (herein "individual discovery mode") as well as based on exploiting broadcast signals received from one or more PDAs (herein "PDA based discovery mode"). Both modes may coexist at a terminal UE, e.g. while a PDA based discovery mode is active, the individual discovery mode may be reduced or asleep.

Figure 3:
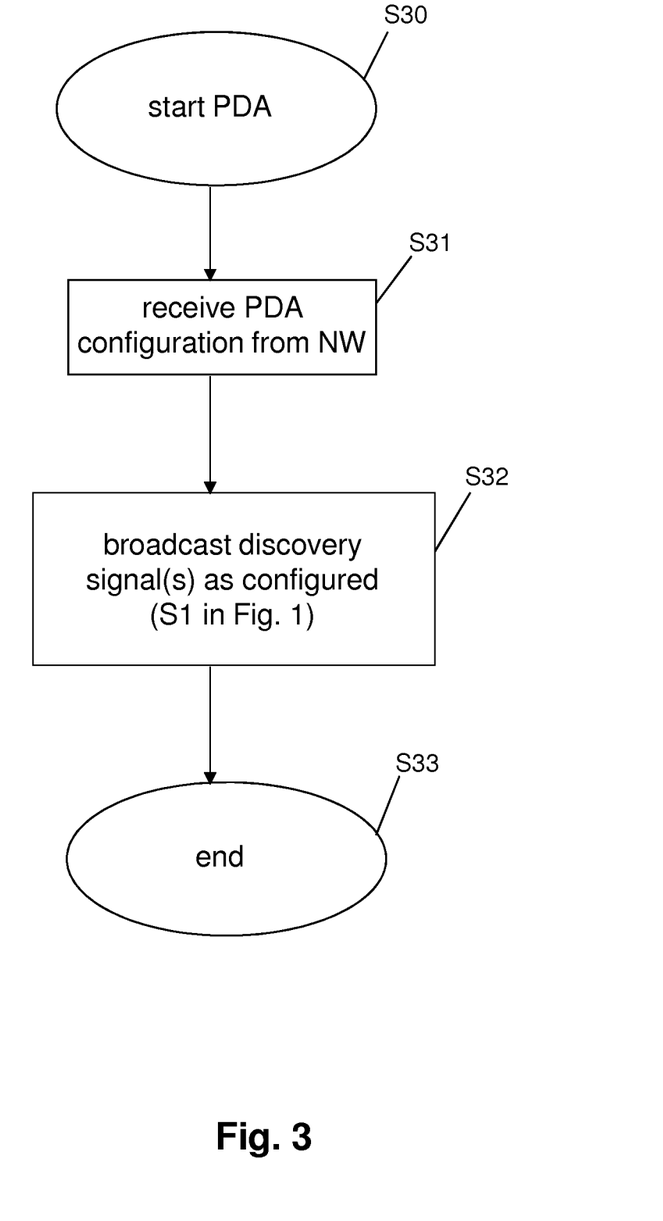
FIG. 3 illustrates an example of at least an aspect of a processing performed at a proximity discovery agent.

FIG. 3 illustrates an example of at least an aspect of a processing performed at a proximity discovery agent, PDA. FIG. 3 shows a processing performed, upon its selection as PDA, at a respective selected proximity discovery agent PDA according to at least some scenarios according to the present invention. The process at a PDA starts in a stage S30. Then, in a stage S31, the selected PDA receives its PDA configuration from a network entity NW. Such configuration pertains for example to a "FDA indication" to be broadcasted as part of system information, or to a unique proximity discovery signal, PDS, within a certain device-to-device service area. A configuration to broadcast a PDA indication or a PDS also involves a configuration of corresponding transmission resources in frequency/time domain, transmission power, transmission interval and so on for the broadcasting. Once being correspondingly configured as a PDA in terms of proximity discovery signal(s) to be broadcasted, the thus configured PDA broadcasts the discovery signal or signals according to its configuration, as illustrated in stage S32 in FIG. 3. The process ends in a stage S33.

Optionally, but not shown in FIG. 3, the process may loop back to stage S31 in case a PDA needs to be re-configured, e.g. based on internal reasons residing at the PDA, or based on/triggered by external reasons residing in the network environment, for example.

Figure 4:
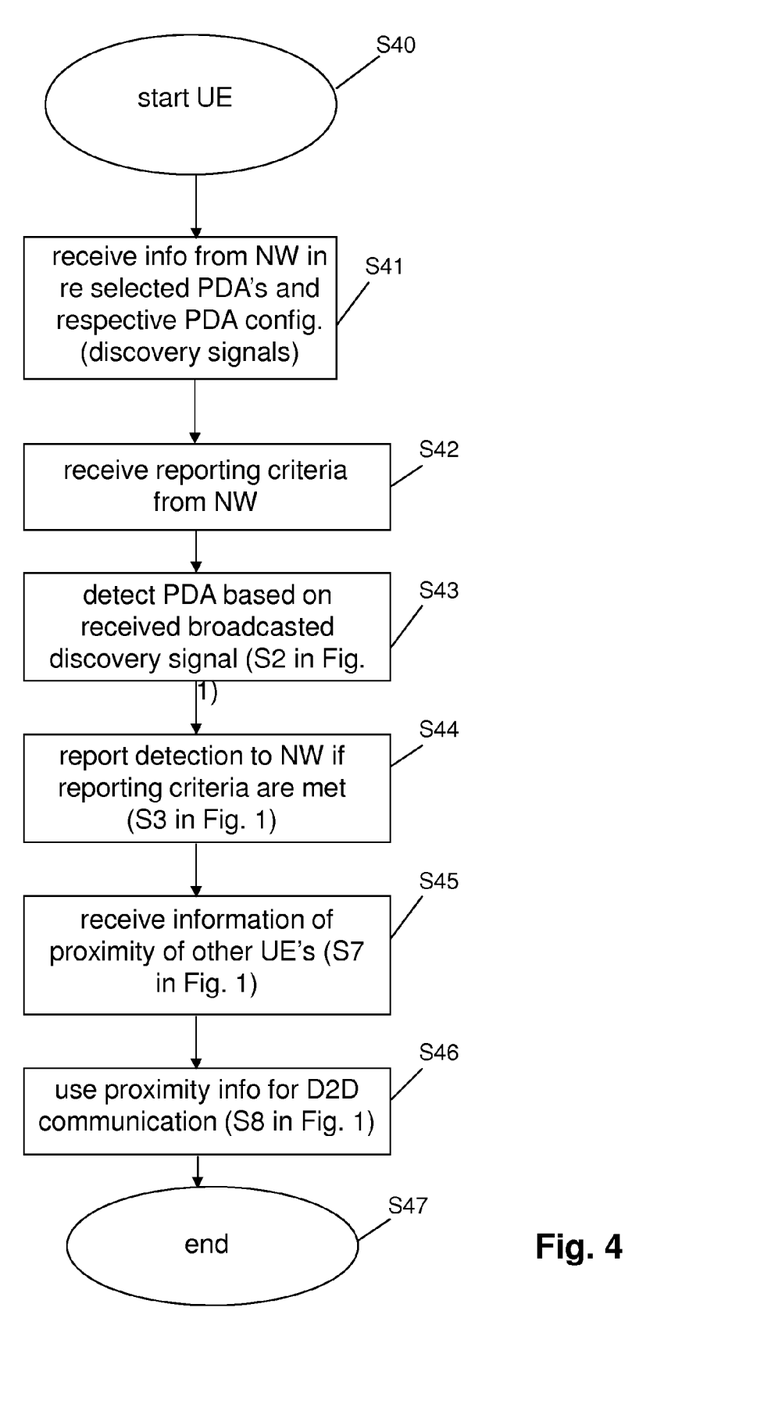
FIG. 4 illustrates an example of at least an aspect of a processing performed at a terminal such as a UE.

FIG. 4 illustrates an example of at least an aspect of a processing performed at a terminal such as a UE. The process starts in a stage S40. Subsequently, in a stage S41, a respective user equipment UE or, generally, a respective terminal receives information from the network in terms of selected proximity discovery agents and respective PDA configurations (i.e. discovery signals to be detected). Further, in a stage S42, the respective user equipment receives reporting criteria from the network entity. The reporting criteria can be informed separately (as shown), or simultaneously with S41. Thus, optionally, stages S41 and S42 could be combined in a single stage or single transmission from the network NW to the user equipment UE. However, since the PDAs that are selected are the same for all user equipments, this information could be broadcasted from the network to the user equipments. On the other hand, since the reporting criteria may differ among terminals (i.e. be terminal specific) and be individually configured for each terminal, such information could be sent from the network towards a respective individual user equipment, for example in a dedicated signaling within for example radio resource control messages. Further, once having received the information on PDAs as well as on reporting criteria from the network, a respective terminal UE detects one or more PDAs based on the received broadcasted discovery signals from the PDAs (see also stage S2 in FIG. 1), as illustrated in stage S43 in FIG. 4. Further, in a stage S44 (see also stage S3 in FIG. 1), a user equipment reports the detection to the network, if the reporting criteria are met. E.g. some time later, in a stage S45 (see also stage S7 in FIG. 1), a terminal UE receives information from the network concerning a proximity of other terminals or UE's that may be available for device-to-device, D2D, communication. Thereafter, in a stage S46 (see also stage S8 in FIG. 1), a terminal may use such proximity information in order to perform D2D communication with discovered terminals in its proximity.

Then, at some point of time, this process ends in a stage S47. Optionally, but not shown in FIG. 4, the process branches to a D2D communication processing routine (not shown), or triggered by some conditions prevailing at e.g. the UE side, the process loops back to stage S45 to receive subsequent (updated) information of a proximity of other terminals.

Further optionally, but not shown in FIG. 4, the process may loop back to stage S41/S42 in case PDA's are dynamically selected or re-selected, or in case reporting criteria are changed. In such case, in case PDA's are statically selected, the process may loop back to stage S42 only. The criteria to loop back may be preconfigured e.g. after a lapse of a predetermined period of time, or triggered by some network event or terminal event.

Additional aspects pertaining to a terminal's proximity discovery are described later on with reference to FIG. 6, as mentioned earlier above.

Figure 5:
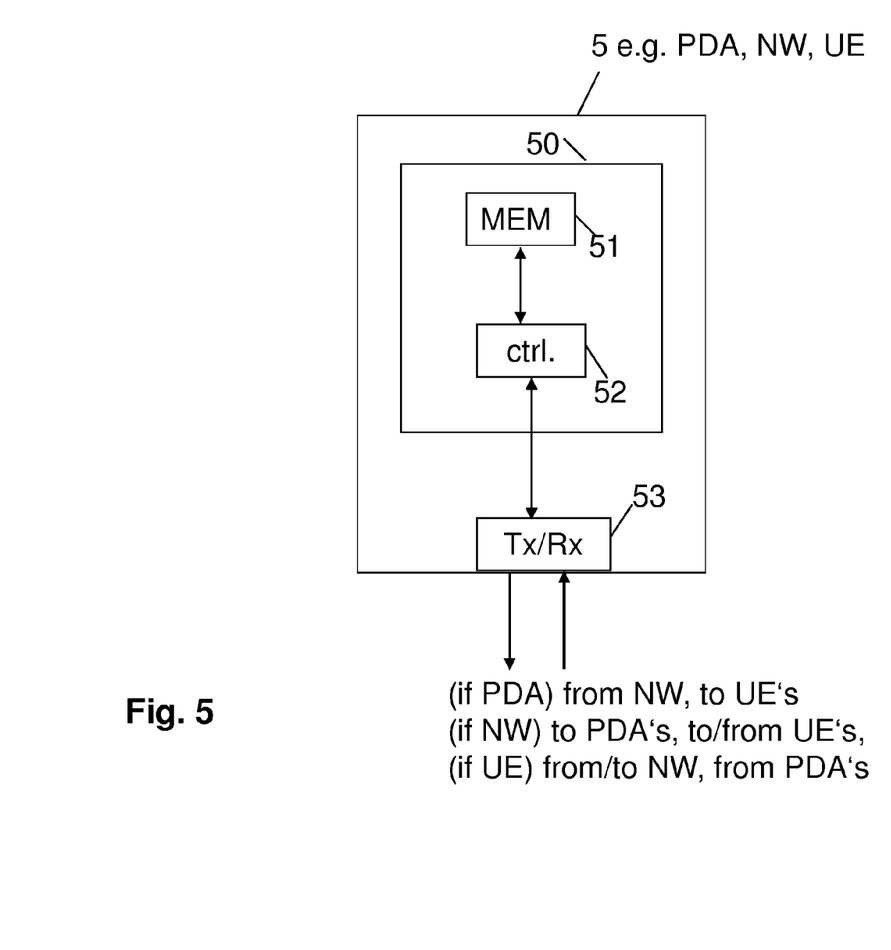
FIG. 5 illustrates an example of a basic block circuit diagram of a respective entity such as a network entity NW (such as a eNB or MME), as well as of a proximity discovery agent PDA, as well as of a terminal such as a UE.

FIG. 5 shows a basic block circuit diagram of a respective entity according to at least some aspects of the present invention. Such entity may be a network entity NW, e.g. a eNB or MME, or a terminal such as a user equipment UE, or a proximity discovery agent PDA, in which at least respective individual aspects and/or embodiments of the present invention are implemented.

Thus, the entity 5 can be a eNB, or pico/femto eNB, or a WLAN (WiFi™) access node, or a terminal such as a user equipment UE, or a proximity discovery agent PDA, and may also unite e.g. terminal and PDA properties/functionalities in some scenarios or network and PDA properties/functionalities in some scenarios.

The entity denoted by numeral 5, comprises an interface, Tx/Rx, cf. numeral 53, for transmission to/reception from another entity. For example in case of a PDA, the interface receives (configuration) data from a network entity NW and transmits/broadcasts (PDA indication, PDS) data to terminals UE. In case of a network entity NW, the interface receives data (PDA detection reports) from terminals, UEs, and transmits data (proximity indications pertaining to neighboring terminals as well as reporting criteria configuration and PDA information to detect PDAs) to terminals UE and also transmits data (PDA configuration) to PDA entities. Further, in case of a terminal UE, the interface receives data from the network entity NW (PDA information to detect PDAs, reporting criteria, proximity indications pertaining to neighboring terminals) and from the PDA entities (broadcasted signals, e.g. PDA indication or PDS), and transmits data to the network entity NW (PDA detection reports). The interface is bidirectionally connected to a control module or unit such as a processor, e.g. a digital signal processor, DSP, or ASIC (ASIC=application specific integrated circuit), CPU (central processing unit), or the like, denoted by numeral 52. The control module or unit (aka controller) is bidirectional connected to a memory module or unit (aka memory) MEM, denoted by numeral 51. The memory module can be any type of memory to which data can be written and from which data can be read, e.g. a Flash memory, RAM (Random Access Memory), or also EPROM (Electrically Programmable Read Only Memory). The memory module is configured to store at least data necessary for implementation of the invention, e.g. control code, acquired and/or processed data to be used for implementing/realizing at least aspects of the invention, and in this regard in particular the data mentioned above to be transmitted/received. Thus, the memory module can be a separate memory module or a partition of a memory module storing also other user/control data handled by the respective entity. Other memory modules may be present, too, in the entity. Examples of the invention can be embodied in an apparatus or unit of the entity, e.g. denoted by numeral 50, comprising at least the modules 52 and 51 above.

FIG. 6 shows a flowchart of an example of at least another aspect of a processing performed at a terminal such as a UE. FIG. 6 assumes an example scenario and aspect of the invention according to which terminals are configurable to perform proximity discovery based on different proximity discovery modes, i.e. their own broadcasted discovery signals (herein "individual discovery mode") as well as based on exploiting broadcast signals received from one or more PDAs (herein "PDA based discovery mode"). Both modes may coexist at a terminal.

As shown in FIG. 6, a process starts at a stage S60.

In a stage S61, the terminal detects a discovery mode setting. Generally, the discovery mode setting detection may be externally triggered (e.g. by receipt of a corresponding instruction from the network), or internally triggered (e.g. based on an internal state of the terminal such as a state in which power saving at the terminal shall start because individual broadcasting signals would be too power consuming and/or would reduce the operation time of the terminal due to battery charging state, or the like). A trigger signal may also be generated based on joint evaluation of network and terminal conditions. It is assumed for this example scenario that the setting is such that the UE shall perform proximity discovery based on broadcasted discovery signals to be received from PDAs. (Though, another starting point setting may also be applicable in another example.)

In a stage S62, it is checked whether broadcasted signal(s) from one or more PDAs are detected.

If not, (NO in S62) the flow branches to stage S63. The terminal then operates in its "individual discovery mode" and broadcasts its own individual discovery signals and performs proximity discovery in stage S65 according to such individual mode, e.g. based on the responses received to its broadcasted "invitation" signals or based on other terminal's broadcasted signals. Afterwards, the flow loops back to S61, where a discovery mode setting may be detected.

If PDA originated broadcast signals are received, (YES in S62) the flow branches to stage S64. The terminal in that stage adapts its "individual discovery mode". For example, the frequency of the individual broadcasted signals is reduced (time interval there between increased), and in an extreme case, the time interval is so long that the individual mode is asleep and can be regarded as being switched off. Additionally or alternatively, the transmit power of the individual broadcast signals is reduced or switched off so as to contribute to power saving at the UE. Then, the UE performs proximity discovery in stage S66 according to the PDA based mode, i.e. based on the broadcasted discovery signals from one or more proximity discovery agents, PDAs. The UEs "individual discovery mode" in such condition is reduced, suppressed or switched off dependent on the parameters adapted and the amount of adaptation. Afterwards, the flow loops back to S61, where a discovery mode setting may be detected.

Thus; as has been described before, according to at least an aspect of the invention there is introduced an entity named Proximity Discovery Agent (PDA) to assist proximity discovery. This alleviates the need to rely (only) on detection of the discovery signal broadcasted by each individual terminal device as proposed in prior art. According to at least an aspect of the invention, upon detecting one or more PDAs, a terminal UE reports this to the network, i.e. a network entity. The network, based on the reports from all the terminal devices within at least a certain (network) service area, determines and informs the terminal device which other terminal devices are in proximity.

Hereinabove, various aspects have been described on a rather general or functional level. Thus, some more details of those aspects will be outlined herein below. Hence, insofar above mentioned aspects of the invention encompass also at least the following features:

1) PDA Selection/Configuration

Generally, any node within a network or a certain service area may be appointed or selected as PDA. This means that access points forming part of the network but also terminals present within the service area may be selected or appointed and configured to act as PDA.

1a) Network Entities Acting as PDA

Under this aspect at least, it is proposed that some deployed local access points, i.e. access network entities (e.g. micro/pico BTS or eNBs, femto AP, WLAN (or WiFi™ AP, relay node) may be semi-statically or dynamically selected as PDA to facilitate proximity discovery.

i) As fully backward compatible option, the selection of the PDAs is transparent to the selected local access points so that they don't need any further configuration to "act" as a PDA, i.e. to be perceived as PDA by terminals. Rather, under this aspect, in such scenario the terminals UE, based on their configuration received from the network (as also set out below) and based on the normal (not amended) downlink transmissions from local access points, detect transmissions from those PDAs.

ii) As another option, a selected local access point may be configured to advertise itself as PDA. In relation to this option, the broadcasted system information may be extended to include e.g. such "PDA indication" (e.g. coded by one bit indicating the PDA status) to enable terminals UE to detect such PDAs. In this option, UE doesn't need to be given any PDA information beforehand. Based on the PDA indication read from the system information of the detected local cells, UE can detect the PDA.

iii) As still another option, selected local access points may be configured to broadcast a proximity discovery signal (PDS) that is unique within a certain D2D service area. In addition to the unique PDS, a selected local access point may also be configured with the PDS transmission resources, i.e. resources e.g. in frequency/time domain, the PDS transmission power and/or the transmission interval etc.

The PDS transmission power may be configured depending on required proximity discovery/D2D communication range, and is therefore independent of the transmission power of the other normal (broadcasting) channels of the local AP.

The PDS transmission interval may be configured dynamically depending on e.g. the load of the proximity discovery enabled UEs in the D2D service area and/or the reported number of the proximity devices. For example, the PDS transmission interval may be set to a maximum value (e.g. corresponding to sleep mode of PDS transmission) if no any device has reported to detect the PDA for certain time period.

1b) Terminal Entities Acting as PDA

Under this aspect, it is proposed that one or more terminals UE may be dynamically selected and configured to act as PDA. In addition to UE's capability, battery status, geographical location and cellular network connection mode (e.g. RRC connected state or idle state), the selection may also be based on the UE's proximity discovery context such as PDA detection reports, proximity discovery use cases (restricted or open ProSe discovery), the number of devices who either want to discover the UE or which the UE wants to discover and so forth. For instance, the UE, who reports no PDA was detected or who didn't give any PDA detection report; or who wants to be discoverable by any other devices; or who is most interested in being discoverable, may be selected and configured to act as PDA. As proposed also above, such selected UE may be configured with a unique PDS to broadcast and as well the PDS transmission resources mentioned above, i.e. time/frequency, power and interval.

Note that the entities PDA present within a network or network service area may be a mixture of the devices mentioned under 1 above, i.e. differently configured access points as well as terminals may coexist and act as PDA, respectively.

2) Terminal UE Configuration

Generally, for each aspect mentioned above, it is to be understood that a proximity discovery enabled UE is configured so as to detect and report PDA to the network.

2a) UE Detection Configuration i) For the backward compatible option (cf. 1)a)i)) proposed above, the UE is configured with the list of the PDAs in current D2D service areas. Configuration of a terminal UE, for example, is effected upon registration to the D2D service area or in case of a location update of terminal. The list of the PDA includes for example downlink (DL) carrier frequency, the physical cell identifiers (e.g. PCI in LTE) and the logical cell identifiers (e.g. ECGI of LTE cell,) of the cellular network based local access points and the BSSID of the WLAN (WiFI™) access points that are selected as PDA in current D2D service area. The list of PDA may also include the overlay cellular network environment for each PDA, in order to further limit the unnecessary PDA search from proximity discovery enabled UEs.

ii) for option 1)a)ii) above, the UEs do not need a specific configuration beyond the one set out in 2)a)i) above, as the PDA indication (flag) will then be detectable as such by a respective UE, though in this option, a terminal UE might have to do excessive radio scanning.

iii) For the option (cf. 1)a)iii) or 1)b)) above in terms of PDS being broadcasted by either local access points acting as PDA or UE acting as PDA, the UE may be configured with the possible PDSs and also the PDSs transmission resources in frequency/time domain. The configuration may be hardcoded (e.g. defined by standardization), broadcasted as the common control signaling by the macro and/or local cells of the D2D/ProSe service area, or transmitted to the UEs as the dedicated signaling via cellular network.

2b) UE Reporting Configuration

The UE may also be configured with PDA detection reporting criteria to manage and avoid unnecessary reporting.

For example, a terminal UE may be configured to report a detected PDA only in certain stable detection condition such as only after it detects the same PDA for certain time period, or detects the same PDS for N consecutive times, or if the received power difference of the e.g. two consecutive detections of PDS is not larger than a certain threshold.

As another example, the UE may be configured to report as many as detected PDAs including the PDAs of other operators in the overlapping service areas or the UE may be configured to detect and report only home/serving operator's PDAs.

Insofar, as described herein above and as derivable there from, the present invention, according to at least some aspects thereof, encompasses, under a network entity aspect, an apparatus, comprising a control unit (52) configured to interface at least one other apparatus, wherein the control unit is configured to receive (S4) a plurality of reports (S3a, S3b, S3c) from respective terminals (UE#1, UE#2, UE#3), each report being indicative of a detection of at least one particular apparatus (PDA#1, PDA#2) of a specific type (PDA) by the respective terminal, analyze (S5) the plurality of reports in terms of which terminal reported a detection of which particular apparatus of the specific type, determine (S5) that terminals, the reports of which are indicative of the same particular apparatus of the specific type, are in proximity to each other, and cause transmission of a corresponding proximity indication to each terminal for which a proximity to one or more other terminals was determined;

while under a proximity discovery agent entity aspect, an apparatus, comprising a control unit (52) configured to interface at least one other apparatus, wherein the control unit is configured to receive (S31) an indication of being selected as a particular apparatus of a specific type, and responsive thereto broadcast a signal indicative of the apparatus being selected as a particular apparatus of a specific type;

while under a terminal entity aspect, an apparatus, comprising a control unit (52) configured to interface at least one other apparatus, wherein the control unit is configured to detect at least one particular apparatus (PDA#1, PDA#2) of a specific type (PDA), and cause transmission of a report indicative of the detection, and further, under a subaspect thereof an apparatus the control unit of which is further configured to operate in two modes for detecting other in its proximity, a first mode being based on signals broadcasted by the apparatus itself, and a second mode being based on received signals being broadcasted by another apparatus of a specific type, wherein the control unit is further configured to, responsive to the detection of at least one particular apparatus of the specific type, adapt operation parameters of the first mode.

Note that embodiments of the present invention may be implemented in software, hardware, application logic or a combination of software, hardware and application logic. The software, application logic and/or hardware generally resides on a module or unit, or chipset or apparatus associated to a device, i.e. mounted/inserted or mountable/insertable to or configured as a part of such a device, such as a network entity like an MME or similar functionality, or a terminal UE or the like.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

If desired, the different functions discussed herein may be performed in a different order and/or concurrently with each other. Furthermore, if desired, one or more of the above-described functions may be optional or may be combined.

Although the above description focused on an algorithm aspect, it is to be understood that the algorithm is configurable to corresponding hardware or implemented as software code loaded to a processor.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes apparatuses enabling to improve network controlled discovery in mobile communication networks, and insofar an apparatus such as a network entity, comprising a control unit configured to interface at least one other apparatus, wherein the control unit is configured to receive a plurality of reports from respective terminals, each report being indicative of a detection of at least one particular apparatus of a specific type by the respective terminal, analyze the plurality of reports in terms of which terminal reported a detection of which particular apparatus of the specific type, determine that terminals, the reports of which are indicative of the same particular apparatus of the specific type, are in proximity to each other, and cause transmission of a corresponding proximity indication to each terminal for which a proximity to one or more other terminals was determined. Similarly, corresponding proximity discovery agent entities, i.e. apparatus of the specific type, corresponding terminal apparatuses and related methods as well as computer program products are envisaged.

LIST OF SOME ACRONYMS AND ABBREVIATIONS AS USED HEREIN ABOVE

D2D device-to-device communication
P2P Peer-to-Peer
PDS Proximity Discovery Signal
ProSe Proximity Services
PDA Proximity Discovery Agent
LTE™ Long Term Evolution
LTE™-A LTE™-Advanced
WCDMA Wideband Code Divisional Multiple Access
UMTS Universal Mobile Telecommunication System
3GPP 3$^{rd}$ Generation Partnership Project
ETSI European Telecommunication Standards Institute
NGMN Next Generation Mobile Networks
eNB evolved NodeB
MME mobility management entity
UE user equipment
WLAN Wireless Local Area Network (aka WiFI™)
EUTRAN Evolved UTRAN
UTRAN Universal Terrestrial RAN
RAN Radio Access Network
PRB Physical Resource Block
AP Access Point
DL downlink
PCI Physical Cell Identifier
ECGI E-UTRAN Cell Global Identifier
BSSID Basic Service Set Identifier

What is claimed is:

1. An apparatus, comprising:
 a control unit configured to interface at least one other apparatus, a memory unit connected to the control unit, the memory unit maintaining a list of at least network entities, their associated identification information and their broadcast system information,
 wherein the control unit is configured to
  receive a plurality of reports from respective terminals, each report being indicative of a detection of at least one respective discovery signal transmitted from at least one corresponding particular apparatus of a specific type by the respective terminal, wherein each said at least one corresponding particular apparatus is identifiable by said at least one respective discovery signal,
  analyze the plurality of reports in terms of which terminal reported a detection of which particular apparatus of the specific type,
  determine that terminals, the reports of which are indicative of the same particular apparatus of the specific type, are in proximity to each other,
  cause transmission of a corresponding proximity indication to each terminal for which a proximity to one or more other terminals was determined; and
  select one or more of the network entities as particular apparatus of a specific type.

2. An apparatus according to claim 1: wherein the control unit is further configured to
 cause transmission of information indicative of the selected network entities in terms of their identification information and their broadcast system information towards the terminals.

3. An apparatus according to claim 1: wherein
 the control unit is further configured to
 configure the selected network entities so as to include an indication of their status of being selected as a particular apparatus of a specific type in their broadcast system information.

4. An apparatus according to claim 1: wherein
 the memory unit maintains a list of at least terminals and their associated identification information, and
 the control unit is further configured to
 select one or more of the terminals as particular apparatus of a specific type.

5. An apparatus according to claim 1: wherein
 the control unit is further configured to
 configure the selected network entities and/or selected terminals so as to broadcast a proximity discovery signal which uniquely identifies a particular apparatus of a specific type within a service area of a network or uniquely identifies a service area of a network where it is broadcasted.

6. An apparatus according to claim 1: wherein
 the control unit is further configured to
 select one or more of the network entities based on at least a geographical distribution of those entities within the network area and/or a number of terminals within a service area of a network.

7. An apparatus according to claim 1: wherein
 the control unit is further configured to
 provide terminals with criteria which trigger a terminal's report indicative of a detection of at least one particular apparatus of a specific type.

8. An apparatus according to claim 7: wherein
 the criteria comprise at least one of the following:
 detection of a same apparatus of a specific type for a certain time period,
 detection of a same unique proximity discovery signal for a number of consecutive times,
 detection that a received power difference in a sequence of at least two consecutive detections of the same unique proximity discovery signal is not larger than a threshold,
 reporting an apparatus of a specific type selectively dependent on an operator of the apparatus.

9. An apparatus, comprising:
 a control unit configured to interface at least one other apparatus, a memory unit connected to the control unit, the memory unit maintaining a list of at least network entities, their associated identification information and their broadcast system information,
 wherein the control unit is configured to
  receive an indication of being selected as a particular apparatus of a specific type, and responsive thereto broadcast a signal indicative of the apparatus being selected as a particular apparatus of a specific type, wherein the signal includes at least one respective discovery signal transmitted from the apparatus so that the apparatus is identifiable by said at least one respective discovery signal;
  analyze the plurality of reports in terms of which terminal reported a detection of which particular apparatus of the specific type, determine that terminals, the reports of which are indicative of the same particular apparatus of the specific type, are in proximity to each other, cause transmission of a corresponding proximity indication to each terminal for which a proximity to one or more other terminals was determined; and select one or more of the network entities as particular apparatus of a specific type.

10. An apparatus according to claim 9: wherein
the indication of being selected as a particular apparatus of a specific type comprises a status indication, and the control unit is configured to include that status indication in the broadcast system information.

11. An apparatus according to claim 9: wherein
the control unit is configured to receive information defining a unique proximity discovery signal which uniquely identifies a particular apparatus of a specific type within a service area of a network or uniquely identifies a service area of a network where it is broadcasted, and responsive thereto, broadcast the unique proximity discovery signal.

12. An apparatus, comprising:
a first control unit configured to interface at least one other apparatus,
wherein the first control unit is configured to
detect at least one particular apparatus of a specific type, and
cause transmission of a first report indicative of the detection, wherein the first report is indicative of a detection of at least one respective discovery signal transmitted from said at least one particular apparatus by the respective terminal, wherein each said at least one particular apparatus is identifiable by said at least one respective discovery signal; and wherein the first report is transmitted to a second control unit, where the second control unit includes a memory unit for maintaining a list of at least network entities, their associated identification information and their broadcast system information, and where the second control unit
receives a plurality of reports from respective terminals, including the first report,
each report being indicative of a detection of at least one respective discovery signal transmitted from at least one corresponding particular apparatus of a specific type by the respective terminal, wherein each said at least one corresponding particular apparatus is identifiable by said at least one respective discovery signal,
analyzes the plurality of reports in terms of which terminal reported a detection of which particular apparatus of the specific type,
determines that terminals, the reports of which are indicative of the same particular apparatus of the specific type, are in proximity to each other, and
causes transmission of a corresponding proximity indication to each terminal for which a proximity to one or more other terminals was determined; and
selects one or more of the network entities as particular apparatus of a specific type.

13. An apparatus according to claim 12: wherein
The first control unit is further configured to
receive a proximity indication comprising the identities of terminals which are in proximity to the apparatus.

14. An apparatus according to claim 12: wherein
the first control unit is further configured to
receive information indicative of selected network entities in terms of their identification information and their broadcast system information towards terminals, and
detect the at least one particular apparatus of the specific type based on received broadcasted information from network entities which match with the received information.

15. An apparatus according to claim 12: wherein
the first control unit is further configured to
receive information indicative of configured unique proximity discovery signals, which proximity discovery signal uniquely identifies a particular apparatus of a specific type within a service area of a network or uniquely identifies a service area of a network where it is broadcasted, and respective proximity discovery signal broadcast transmission resources, and
detect the at least one particular apparatus of the specific type based on a received broadcasted unique proximity discovery signal.

16. An apparatus according to claim 15: wherein the received information comprises and detection is based on proximity discovery signals' broadcast transmission resources comprising at least one of: frequency domain, time domain, transmission power and transmission interval.

17. An apparatus according to claim 12: wherein
the first control unit is further configured to
receive criteria which trigger a terminal's report indicative of a detection of at least one particular apparatus of a specific type.

18. A method, comprising:
receiving, by a control unit configured to interface at least one other apparatus, and having a memory unit connected to the control unit, the memory unit maintaining a list of at least network entities, their associated identification information and their broadcast system information, a plurality of reports from respective terminals, each report being indicative of a detection of at least one respective discovery signal transmitted from at least one corresponding particular apparatus of a specific type by the respective terminal, wherein each said at least one corresponding particular apparatus is identifiable by said at least one respective discovery signal,
analyzing, by the control unit, the plurality of reports in terms of which terminal reported a detection of which particular apparatus of the specific type,
determining, by the control unit, that terminals, the reports of which are indicative of the same particular apparatus of the specific type, are in proximity to each other, and
causing transmission, by the control unit, of a corresponding proximity indication to each terminal for which a proximity to one or more other terminals was determined; and
selecting, by the control unit, one or more of the network entities as particular apparatus of a specific type.

19. A non-transitory computer-readable storage medium comprising computer program code embodied therein for use with a computer, the computer program code comprising code for performing the method of claim 18.

* * * * *